United States Patent [19]
Fry

[11] 3,911,201
[45] Oct. 7, 1975

[54] WIRING HARNESS AND METHOD OF MAKING SAME

[75] Inventor: William Lawrence Fry, Haughton, England

[73] Assignee: Rist's Wires & Cables Limited, Birmingham, England

[22] Filed: Mar. 22, 1974

[21] Appl. No.: 453,975

[30] Foreign Application Priority Data
Apr. 4, 1973  United Kingdom............... 16065/73

[52] U.S. Cl............... 174/72 A; 156/47; 174/117 F
[51] Int. Cl.²..................... H02G 3/02; H01B 13/00
[58] Field of Search.......... 174/72 A, 72 TR, 117 R, 174/117 F, 117 FF, 117 PC, 117 A; 156/47

[56] References Cited
UNITED STATES PATENTS

| | | | |
|---|---|---|---|
| 3,023,692 | 3/1962 | Crown | 174/72 A X |
| 3,733,428 | 5/1973 | Fry | 174/72 A |

FOREIGN PATENTS OR APPLICATIONS

| | | | |
|---|---|---|---|
| 2,098,348 | 3/1972 | France | 174/72 A |
| 1,175,923 | 11/1958 | France | 174/117 A |
| 938,797 | 2/1956 | Germany | 174/117 F |
| 2,012,852 | 1/1971 | Germany | 174/72 A |
| 29,149 | 9/1970 | Japan | 174/72 A |

Primary Examiner—Laramie E. Askin
Attorney, Agent, or Firm—Holman & Stern

[57] ABSTRACT

A wiring harness particularly, but not exclusively, for a vehicle including a plurality of leads each having a conductive core in a thermoplastic sheath. A first length of the leads has the sheaths of the leads fused to a first backing strip, and a second length of the leads has the sheaths thereof fused to a second backing strip. The first and second backing strips extend at an angle to one another and the first and second backing strips are overlapped. The overlapping regions of the first and second backing strips are secured together so as to interconnect the first and second backing strips, and the leads are bent adjacent the interconnection of the backing strip so as to extend from one backing strip onto the other backing strip.

9 Claims, 1 Drawing Figure

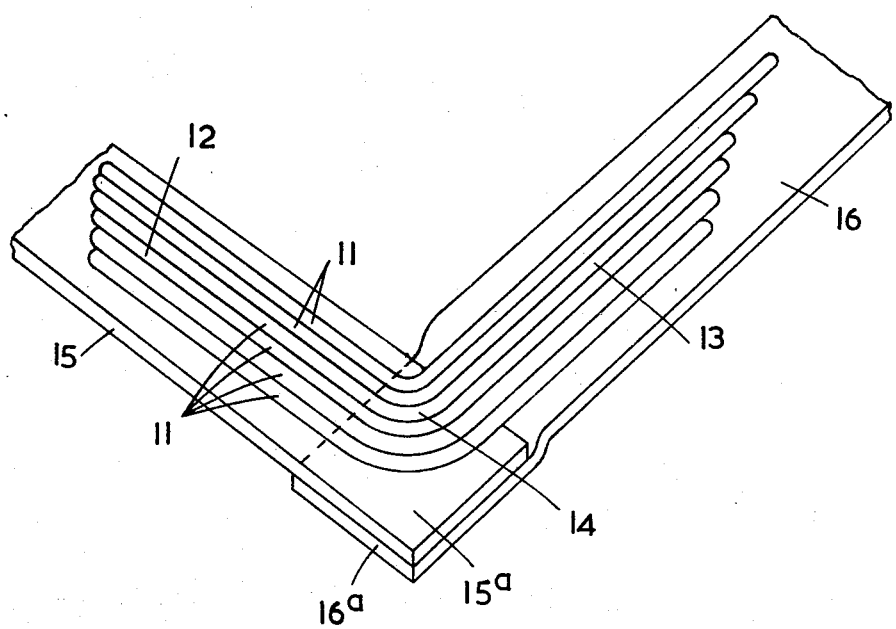

WIRING HARNESS AND METHOD OF MAKING SAME

This invention relates to a wiring harness particularly but not exclusively for a vehicle.

A wiring harness according to the invention includes a plurality of leads each of which comprises a conductive core in a thermoplastic sheath, a first flexible elongate thermoplastic backing strip to which the sheaths of a first length of the leads are fused, a second flexible elongate thermoplastic backing strip to which the sheaths of a second length of the leads are fused, the second backing strip extending at an angle to the first backing strip, a region of the second backing strip overlapping and being secured to the first backing strip so as to interconnect the first and second backing strips, and the leads being bent adjacent the interconnection of the first and second backing strips so as to extend from one backing strip onto the other backing strip.

Preferably, the curved portions of the leads, between the first and second lengths thereof, have their sheaths fused to that region of the first backing strip which is overlapped by said region of the second backing strip.

Alternatively, the sheaths of the leads are not fused to the region of the first backing strip which is overlapped by said region of the second backing strip so that the curved portions of the leads, where they extend from one backing strip onto the other backing strip, are secured to neither backing strip.

The invention further resides in a method of manufacturing a wiring harness including starting with a plurality of leads each of which comprises a conductive core in a thermoplastic backing strip, fusing to the sheaths of a first length of said leads a first elongate flexible thermoplastic backing strip, arranging a second length of said leads at an angle to said first length of said leads, fusing to said second length of the sheaths of the leads a second flexible elongate thermoplastic backing strip, overlapping regions of the first and second backing strips adjacent the bend in the leads between the first and second lengths of the lead, and, securing said overlapping regions of the first and second backing strips together.

Preferably, the sheaths of the curved portions of the leads between said first and second lengths of the leads are also fused to the first backing strip.

Alternatively, the first backing strip is fused only to the sheaths of the first length of the leads and is laid over but is not fused to the curved portions of the leads.

Preferably, said overlapping regions of said first and second backing strips are fused together during the operation which fuses said second backing strip to the sheaths of said second length of the leads.

The accompanying drawing is a perspective view of part of a wiring harness in accordance with one example of the invention.

Referring to the drawing, the wiring harness includes a plurality of conductive leads 11 each of which includes a conductive core within a thermoplastic, conveniently polyvinylchloride, sheath. The leads 11 extend parallel to one another and are bent intermediate their ends to define first and second straight lengths 12, 13 interconnected by curved portions 14. The first length 12 of the leads 11 is secured to a first elongate, flexible, backing strip 15 formed from thermoplastic material again conveniently polyvinylchloride. The leads are secured to the backing strip 15 by fusion of their sheaths to the backing strip 15. The backing strip 15 includes an end region 15a which engages, and is fused to the sheaths of the curved portions 14 of the leads.

A second flexible, elongate backing strip 16 again formed from thermoplastic material, conveniently polyvinylchloride, is secured to the second length 13 of the leads 11. Again, the sheaths of the leads are fused to the backing strip 16 to retain the leads in position on the backing strip. The backing strip 16 includes an end region 16a which engages the end region 15a of the backing strip 15, and which is secured to the end region 15a. The lengths 12, 13 of the leads extend longitudinally of their respective backing strips 15, 16, and the angle between the lengths 12, 13 of the leads 11 is maintained by the interconnection of the overlapping portions 15a, 16a of the backing strips.

The harness is manufactured in the following manner.

The leads 11 are laid on a platform, in the desired pattern containing the curved portion 14. The backing strip 15 is then laid progressively onto the leads 11 starting from the free end of the length 12 of the leads. As the backing strip 15 is progressively laid onto the leads, the mutually presented surfaces of the sheaths of the leads and the backing strip 15 are heated to a temperature such that, as the backing strip engages the sheaths of the leads, fusion between the backing strip and the sheaths takes place. The backing strip 15 is applied to the leads 11 in this manner until the intended end of the length 12 of the leads is passed, and the portion 15a of the backing strip 15 has been laid onto and fused to the curved portion 14 of the leads. The backing strip 15 which is being applied from a continuous reel of polyvinylchloride tape is then severed from the remaining tape on the reel. The leads 11 together with the backing strip 15 are then removed from the platform, and then relocated on the platform so that the length 13 of the leads 11 occupies the place of the length 12 which of course now has its backing strip 15. The backing strip 16 is then applied to the length 13 of the leads in the manner described above with reference to the backing strip 15, and when the curved portions 14 of the leads is reached, the backing strip 16 is allowed to overlap, and become fused to, the end region 15a of the backing strip 15. Thereafter, the backing strip 16 is severed from the remainder of the p.v.c. tape on the spool. Since the region 16a of the backing strip 16 is fused to the region 15a of the backing strip 15, the lengths 12, 13 of the harness will be retained in the desired angular relationship. In a modification the apparatus is capable of depositing the p.v.c. strip in two angularly spaced linear paths and so there is no need to relocate the leads after fusing the backing strip 15 in place in order to fuse the backing strip 16 in place.

In a further modification, the platform of the apparatus is capable of receiving only linear configurations of leads, and so cannot accommodate the leads 11 in their final configuration, that is to say, containing the curved portions 14. Thus, the leads are laid on the platform without the curve 14 and the backing strip 15 is fused to the sheaths of the leads starting from what will ultimately be the free end of the length 12 of the leads. As described above, the backing strip is fused to the sheaths of the leads as it is laid progressively onto the leads. The backing strip 15 is applied to the leads 11 in this manner until the intended end of the length 12 of the leads is reached, and thereafter the portion 15a of the backing strip 15 is laid onto what will ultimately be the curved portion 14 of the leads, without fusing the portion 15a of the backing strip to the sheaths of the leads. The backing strip 15 is then severed from the remainder of the p.v.c. tape on the reel and the leads 11 together with the backing strip 15 are removed from the platform, and the leads 11 are bent to define the curved portions 14. Thereafter, the leads are relocated on the platform so that the length 13 of the leads occupies the place of the length 12 which of course now has its backing strip 15. The backing strip 16 is then applied to the length 13 of the leads as described above with reference to the backing strip 15 and when the curved portion 14 of the leads is reached, the backing strip 16 is allowed to overlap, and become fused to, the end region 15a of the backing strip 15. Thereafter the backing strip 16 is severed from the remainder of the p.v.c. tape on the reel.

It will be appreciated that in the finished harness the curved portion 14 of the leads is not secured to either backing strip, and, accordingly, during formation of the harness some external means must be utilized to maintain the two lengths of the harness in their desired angular relationship until the backing strip 16 has been secured to the backing strip 15. Moreover, it will be appreciated that both lead lengths could be provided with their backing strip before bending the leads to the desired configuration, the backing strips being secured together after bending.

In an alternative to the methods described above, the backing strips 15, 16 are cut to their predetermined length, and are laid onto the appropriate parts of the leads 11. The backing strips are then fused to the sheaths of the leads by apparatus which is capable of heating the mutually presented surfaces of the sheaths and the backing strip when the backing strip is in situ. Such apparatus may, for example, be radio frequency welding apparatus, but where such apparatus is used, it will be appreciated that no weld will be produced between the regions 15a, 16a of the backing strips. Thus, in this case the backing strips must be interconnected either by a separate fusing operation or by any other convenient means, for example, an adhesive, or mechanical connecting devices.

I claim:

1. A wiring harness including a plurality of leads each of which comprises a conductive core in a thermoplastic sheath, a first flexible elongate thermoplastic backing strip to which the sheaths of a first length of the leads are fused, a second flexible elongate thermoplastic backing strip to which the sheaths of a second length of the leads are fused, the second backing strip extending at an angle to the first backing strip, a region of the second backing strip overlapping and being secured to the first backing strip so as to interconnect the first and second backing strips, and the leads being bent adjacent the inter-connection of the first and second backing strips so as to extend from one backing strip onto the other backing strip.

2. A wiring harness as claimed in claim 1 wherein the curved portions of the leads, between the first and second lengths thereof, have their sheaths fused to that region of the first backing strip which is overlapped by said region of the second backing strip.

3. A wiring harness as claimed in claim 1 wherein the sheaths of the leads are not fused to the region of the first backing strip which is overlapped by said region of the second backing strip so that the curved portions of the leads, where they extend from one backing strip onto the other backing strip, are secured to neither backing strip.

4. A method of manufacturing a wiring harness including starting with a plurality of leads each of which comprises a conductive core in a thermoplastic backing strip, fusing to the sheaths of a first length of said leads a first elongate flexible thermoplastic backing strip, arranging a second length of said leads at an angle to said first length of said leads, fusing to said second length of the sheaths of the leads a second flexible elongate thermoplastic backing strip, overlapping regions of the first and second backing strips adjacent the bend in the leads between the first and second lengths of the leads and, securing said overlapping regions of the first and second backing strips together.

5. A method as claimed in claim 4 wherein the sheaths of the curved portions of the leads between said first and second lengths of the leads are also fused to the first backing strip.

6. A method as claimed in claim 4 wherein the first backing strip is fused only to the sheaths of the first length of the leads and is laid over but is not fused to the curved portions of the leads.

7. A method as claimed in claim 6 wherein the step of arranging the second length of the leads at an angle to the first length of the leads is performed after the first and second backing strips are secured to the first and second lengths of the leads respectively.

8. A method as claimed in claim 4 wherein said region of said first and second backing strips are fused together during the operation which fuses said second backing strip to the sheaths of said second length of the leads.

9. A method as claimed in claim 4 wherein the step of arranging the second length of the leads at an angle to the first length of leads is performed after the first and second backing strips are secured to the first and second lengths of the leads respectively.

* * * * *